(12) United States Patent
Kuji et al.

(10) Patent No.: US 6,569,056 B2
(45) Date of Patent: May 27, 2003

(54) ENGINE BRAKE CONTROL SYSTEM FOR VEHICLE

(75) Inventors: Yasuhiro Kuji, Akashi (JP); Yuichi Kawamoto, Akashi (JP); Kiyohito Takano, Kobe (JP)

(73) Assignee: Kawasaki Jukugyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/051,106

(22) Filed: Jan. 22, 2002

(65) Prior Publication Data

US 2002/0098942 A1 Jul. 25, 2002

(30) Foreign Application Priority Data

Jan. 23, 2001 (JP) ........................................ 2001-014568

(51) Int. Cl.$^7$ .............................................. B06K 41/12
(52) U.S. Cl. ............................................ 477/47
(58) Field of Search ........................................... 477/47

(56) References Cited

U.S. PATENT DOCUMENTS 5,749,804 A  5/1998  Toukura ...................... 477/47

FOREIGN PATENT DOCUMENTS

JP    A 11-165686    6/1999

*Primary Examiner*—Dirk Wright
(74) *Attorney, Agent, or Firm*—Oliff & Berridge, PLC (57) ABSTRACT

An engine brake control system for a vehicle provided with a variable-speed V-belt drive (15) including a drive pulley (6) and a gear transmission (13) disposed below the variable-speed V-belt drive (15) with respect to a power transmitting direction comprises a traveling speed sensor (110), a traveling mode discriminating sensor (111), an engine brake device capable of making engine brake effective by restricting the decrease of the effective diameter of the drive pulley while the vehicle is traveling at a traveling speed not lower than a predetermined traveling speed, and an engine brake control system which makes engine brake ineffective by removing restriction on the decrease of the effective diameter of the drive pulley (26) while the traveling mode discriminating sensor is providing a signal indicating that the vehicle is traveling in a reverse travel mode. The traveling mode discriminating sensor (111) is disposed opposite to a detection rotor (115) attached to a rotating member and provided with at least three projections (120, 121, 122) arranged at unequal angular intervals.

6 Claims, 8 Drawing Sheets

ENGINE BRAKE CONTROL SYSTEM FOR VEHICLE

BACKGROUND OF THE INVENTION

1. Field of the Invention

The present invention relates to an engine brake control system for a vehicle provided with a variable-speed V-belt drive.

2. Description of the Related Art

When the engine of a vehicle provided with a variable-speed V-belt drive including a drive pulley and a V belt, and a gear transmission is idling, the drive pulley of the variable-speed V-belt drive is set in a minimum working diameter and power cannot be transmitted from the drive pulley to the V belt even if the gear transmission is set for a speed other than neutral. Consequently, engine brake is scarcely effective. Another vehicle provided with an engine brake device and a variable-speed V-belt drive including a drive pulley measures the traveling speed of the vehicle by a traveling speed sensor, and engine brake device restricts the decrease of the working diameter of the drive pulley of the variable-speed V-belt drive to a predetermined minimum working diameter to make engine brake effective when the traveling speed is not lower than a predetermined traveling speed.

The former vehicle not provided with an engine brake device needs to be braked or stopped by a braking operation for operating a foot brake or a hand brake either during a forward traveling state or a reverse traveling state on a slope.

In the latter vehicle provided with the engine brake device, engine brake is effective when the traveling speed is not lower than a predetermined traveling speed and hence the frequency of braking operation while the vehicle is traveling a slope is reduced. However, if engine brake becomes effective regardless of the driver's intention particularly while the vehicle is reversing, the driver is apt to feel an unpleasant feeling, which spoils comfortableness in riding on the vehicle.

Particularly, if engine brake becomes suddenly effective while a straddle-type all-terrain vehicle is reversing on a slope, the rider will feel like being pushed backward and is apt to feel an uncomfortable feeling because the seat of the straddle-type all-terrain vehicle is not provided with any backrest and a rider riding the straddle-type all-terrain vehicle is exposed.

SUMMARY OF THE INVENTION

Accordingly, it is an object of the present invention to improve the riding comfortableness of a vehicle while the vehicle is traveling a slop by making engine brake effective only while the vehicle is in forward travel.

Another object of the present invention is to facilitate the compact arrangement of sensors including a traveling speed sensor.

According to the present invention, an engine brake control system for a vehicle provided with a variable-speed V-belt drive including a drive pulley and a gear transmission disposed below the variable-speed V-belt drive with respect to a power transmitting direction comprises a traveling speed sensor for measuring the traveling speed of the vehicle, a traveling mode discriminating sensor for discriminating between a forward travel mode and a reverse travel mode, and an engine brake device capable of making engine brake effective by restricting the decrease of the effective diameter of the drive pulley while the vehicle is traveling at traveling speeds not lower than a predetermined traveling speed; wherein engine brake is made ineffective while the traveling mode discriminating sensor is providing a signal indicating the reverse travel mode.

When the engine is idling and the vehicle is in forward travel on a downhill, the vehicle is accelerated by gravity. Upon the increase of the traveling speed beyond a predetermined traveling speed, the decrease of the working diameter of the drive pulley of the variable-speed V-belt drive is restricted to hold the variable-speed V-belt drive in a power transmitting condition, so that engine brake is effective. On the other hand, when the vehicle is traveling down a downhill in a reverse travel mode, the traveling mode discriminating sensor detects the reverse traveling mode and the engine brake device makes engine brake ineffective. In this case, the vehicle is braked by operating a foot brake or a hand brake.

Preferably, in the engine brake control system according to the present invention, a detection rotor is attached to a rotating member which rotates in directions respectively corresponding to the forward travel mode and the reverse travel mode, the traveling mode discriminating sensor is disposed opposite to the detection rotor, and the detection rotor is provided with three or more projections arranged at unequal angular intervals.

The rotating direction of the detection rotor in the forward travel mode and that of the same in the reverse travel mode can be easily discriminated.

Preferably, in the engine brake control system according to the present invention, the traveling mode discriminating sensor and the traveling speed sensor are disposed so as to detect the rotation of an output shaft included in a gear transmission or a drive shaft connected by a bevel gear mechanism to the output shaft of the gear transmission.

Such arrangement of the traveling mode discriminating sensor and the traveling speed sensor facilitates mounting the traveling mode discriminating sensor and the traveling speed sensor on the vehicle.

Preferably, in the engine brake control system according to the present invention, the traveling mode discriminating sensor and the traveling speed sensor are disposed on the axially opposite sides, respectively, of the gear transmission.

Such disposition of the traveling mode discriminating sensor and the traveling speed sensor facilitates mounting the traveling mode discriminating sensor and the traveling speed sensor on the vehicle.

Preferably, in the engine brake control system according to the present invention, the traveling speed sensor is disposed near the outer circumference of a bevel gear mounted on the drive shaft, and the traveling mode discriminating sensor is disposed near an end of the output shaft opposite the other end of the output shaft on the side of the drive shaft.

Preferably, in the engine brake control system according to the present invention, the plurality of projections formed on the rotor have different circumferential lengths, respectively. Thus, false discrimination between a forward travel mode and a reverse travel mode can be prevented.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

In the following description, terms, right, left, front, rear, forward, rearward and such are used for indicating positions, directions and such with respect to the direction of forward travel of the straddle-type four-wheeled all-terrain vehicle to which the present invention is applied.

Figure 1:
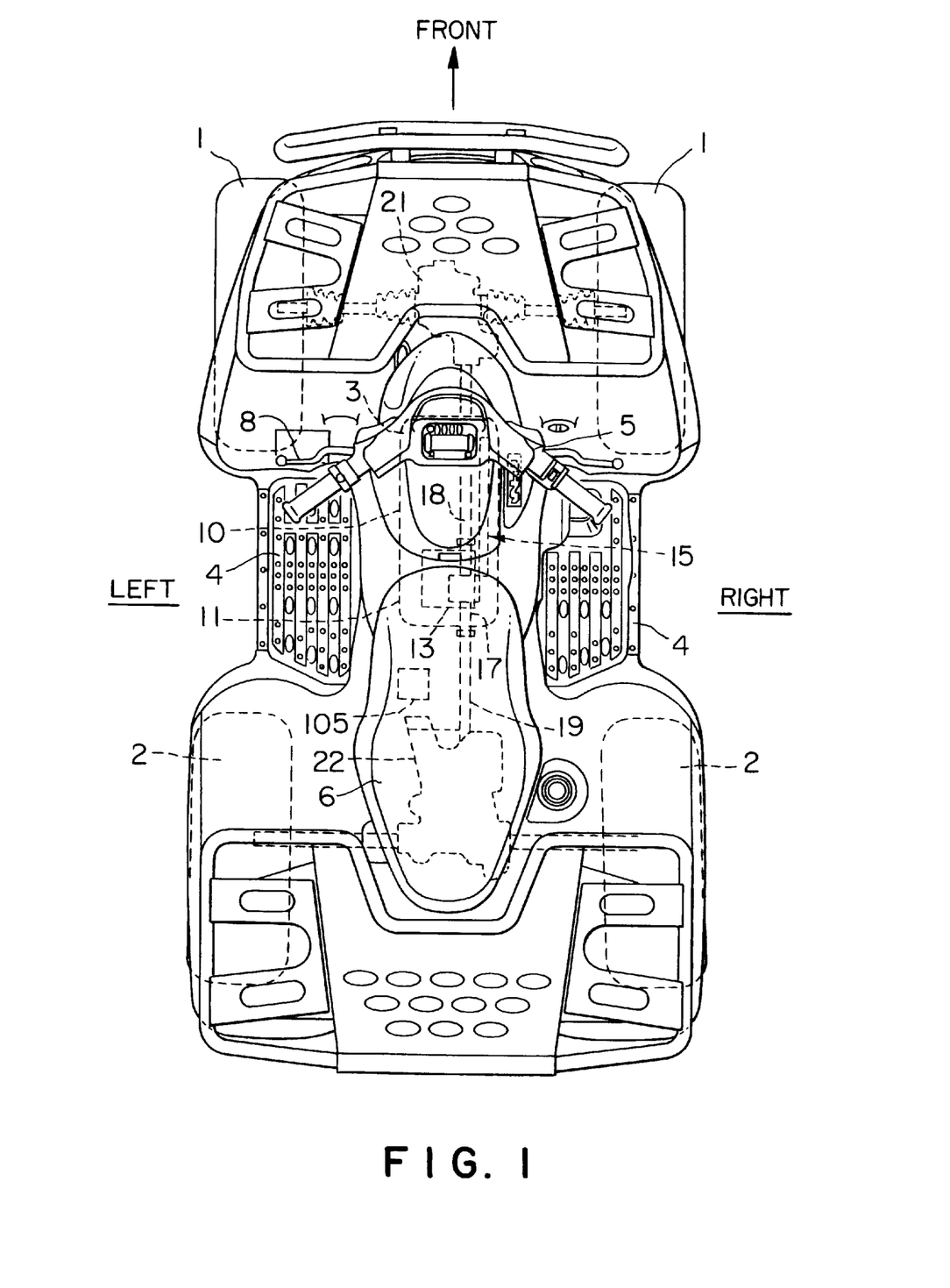
FIG. 1 is a plan view of a straddle-type four-wheeled all-terrain vehicle to which the present invention is applied.

Referring to FIG. 1, an all-terrain vehicle has a body frame, right and left front wheels 1 suspended from a front part of the body frame, right and left rear wheels 2 suspended from a rear part of the body frame, an engine 3 mounted in a middle part of the body frame between the front wheels 1 and the rear wheels 3, and foot boards 4 disposed on the right and the left side of the engine 3, respectively. A handlebar 5 is supported on an upper part of the body frame. A straddle-type seat 6 is disposed behind the handlebar 5. Handgrips are put on opposite ends of the handlebar 5 and levers including a brake lever 8 are supported on the handlebar 5.

The engine 3 has a longitudinally extending crankcase 10. A transmission case 11 is formed integrally with a rear part of the crankcase 10. A gear transmission 13 is formed in the transmission case 11. A variable-speed V-belt drive 15 is joined to the right side wall of the crankcase 10. The variable-speed V-belt drive 15 is above the gear transmission with respect to a power transmitting direction. A longitudinal drive shaft 17 is extended under the transmission case 11. The drive shaft 17 has a front end connected to a front propeller shaft 18, and a rear end connected to a rear propeller shaft 19. The front propeller shaft 18 has a front end part connected to a gear mechanism formed in a front reduction gear case 21. The rear propeller shaft 19 has a rear end part connected to a gear mechanism formed in a rear reduction gear case 22.

Figure 2:
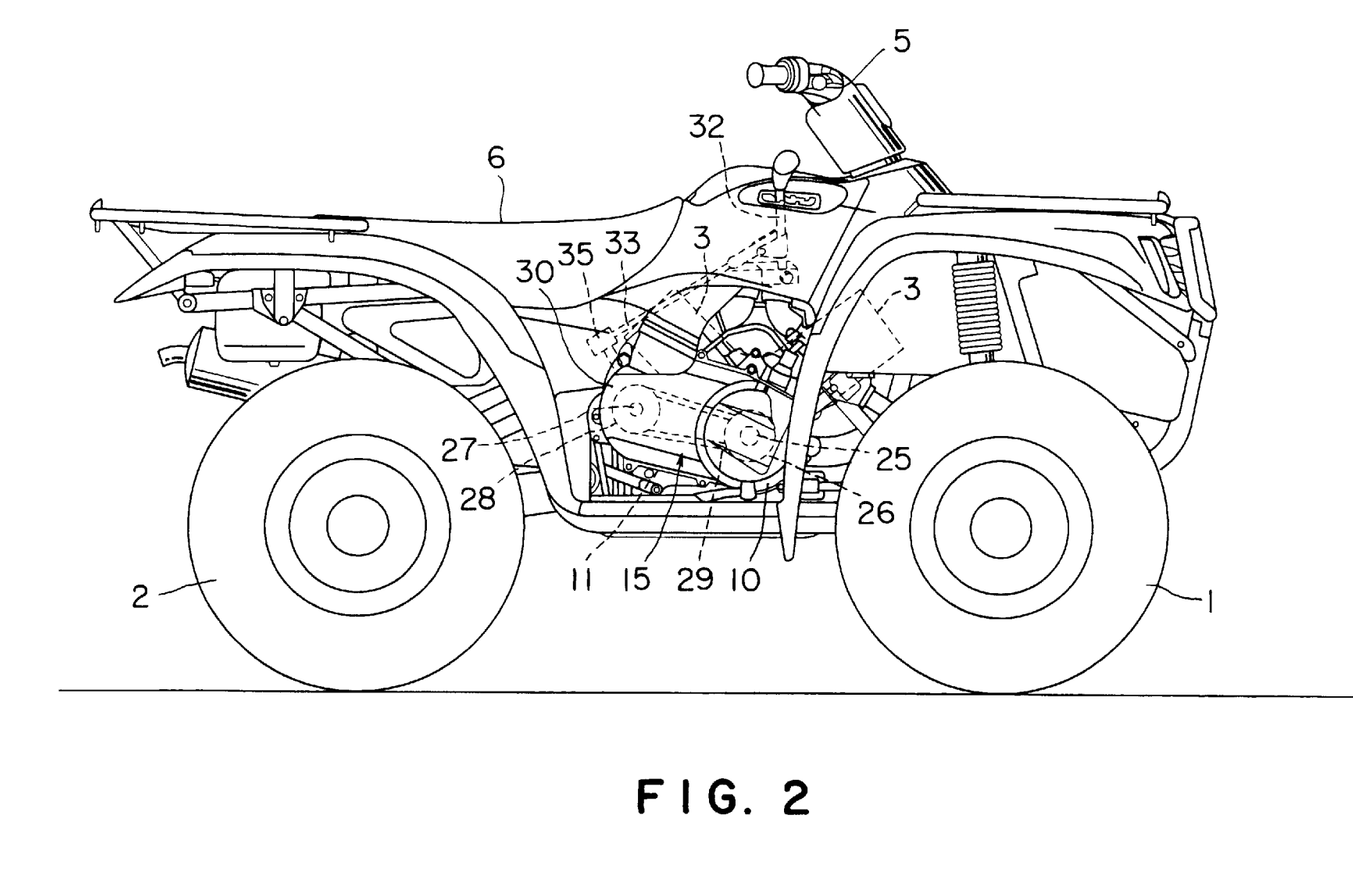
FIG. 2 is a right side elevation of the straddle-type four-wheeled all-terrain vehicle shown in FIG. 1.

Referring to FIG. 2, the engine 3 is a two-cylinder V engine. The variable-speed V-belt drive 15 includes a drive pulley 26, a driven pulley 28 and a V belt 29 extended between the drive pulley 26 and the driven pulley 28. The variable-speed V-belt drive 15 is covered with a belt cover 30.

A shift lever 32 is disposed below the right end of the handlebar 5 and is connected to an external change lever 35 disposed on an upper end part of the transmission case 11 by a connecting rod 33.

Variable-speed V-belt Drive 15

Figure 6:
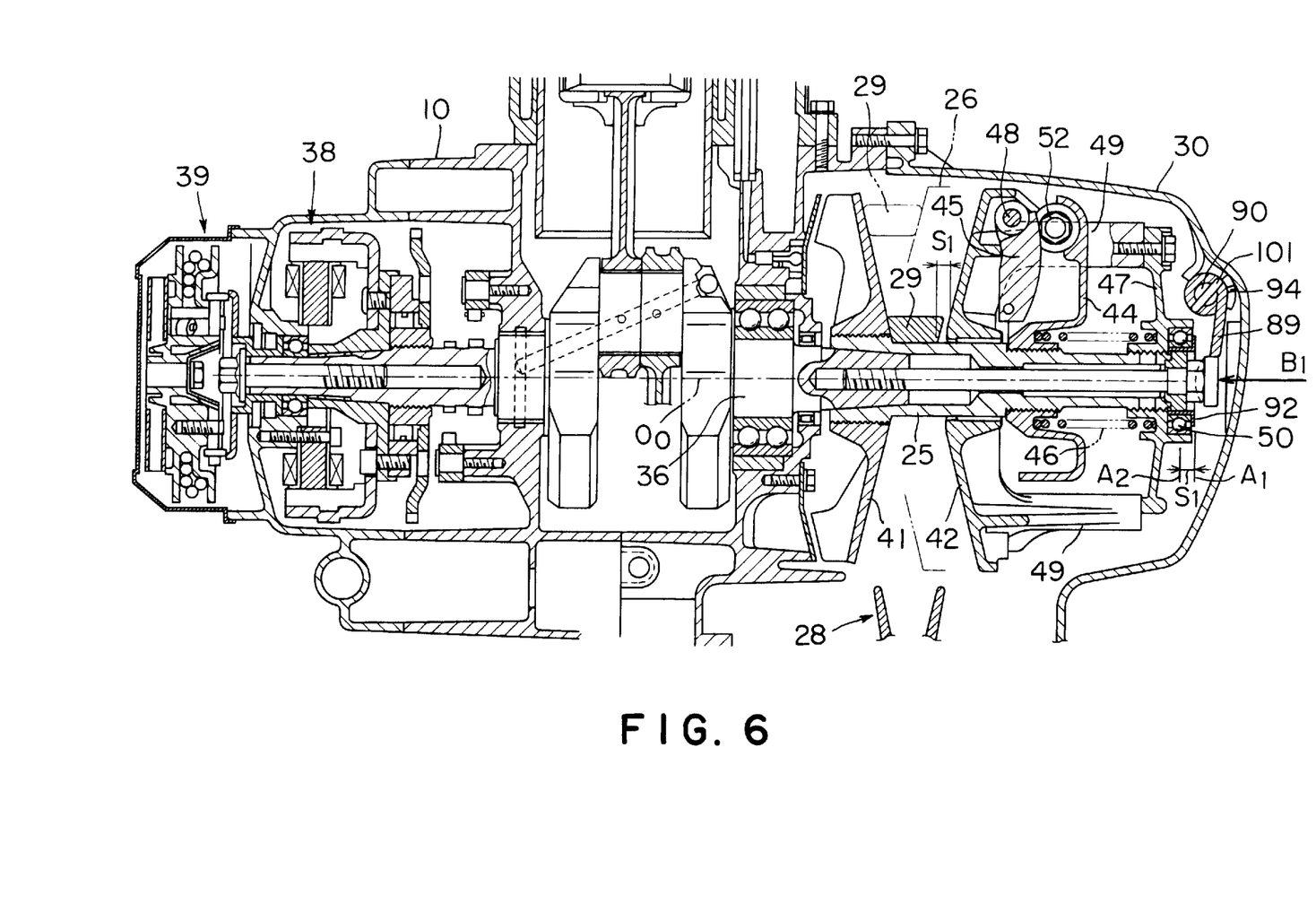
FIG. 6 is a sectional view taken on line VI–VI in FIG. 5.

FIG. 6 is a sectional view in a plane including the axis $O_O$ of a crankshaft 36 of the engine 3. Referring to FIG. 6, a drive shaft 25 is coaxially connected to the right end of the crankshaft 36. A generator 38 and a recoil starter 39 are mounted on a left end part of the crankshaft 36. The drive pulley 26 has a fixed part 41 on the left side and a movable part 42 on the right side. The fixed part 41 is fixedly mounted on the drive shaft 25. The movable part 42 is interlocked with the drive shaft 25 by a spider 44. The movable part 41 rotates together with the drive shaft 25 and is axially movable on the drive shaft 25. A thrusting mechanism including the spider 44, a plurality of flyweights 45, pressure regulating spring 46 and a support plate 477 is disposed on the back side of the movable part 42, i.e., on the right side of the movable part 42. The flyweights 45 are supported pivotally on the back side of the movable part 42 by a plurality of pins 48, respectively. The flyweights 45 are turned gradually away from the movable part 42 on the pins 48 by centrifugal force as the rotating speed of drive shaft 25 increases. A connecting arm 49 extends from the back surface of the movable part 42 through the spider 44 to the right. The support plate 47 is connected to the right end of the connecting arm 49. The support plate 47 is mounted on the drive shaft 25 for axial movement relative to the drive shaft 25. A bearing 50 is fitted in a boss formed on the support plate 47. An annular seat 92 is fitted in the inner ring of the bearing 50. A restricting lever 89 for maintaining engine brake effective is in contact with the annular seat 92.

The spider 44 is disposed on the right side of the movable part 42 and is screwed to the drive shaft. Rollers 52 in contact with the flyweights 45 are supported on the spider 44. The pressure regulating spring 46 is compressed between the spider 44 and the support plate 47 to bias the support plate 47 to the right, so that the movable part 42 is biased to the right indirectly through the connecting arm 49. Thus, the movable part 42 of the drive pulley 26 is biased away from the fixed part 41 of the same. When the flyweights 45 are turned away from the movable part 42 as the engine speed increases, the movable part 42 is moved together with the support plate 47 by reaction force exerted thereon by the rollers 52 against the resilience of the pressure regulating spring 47 to compress the V belt 29 between the fixed part 41 and the movable part 42.

Figure 3:
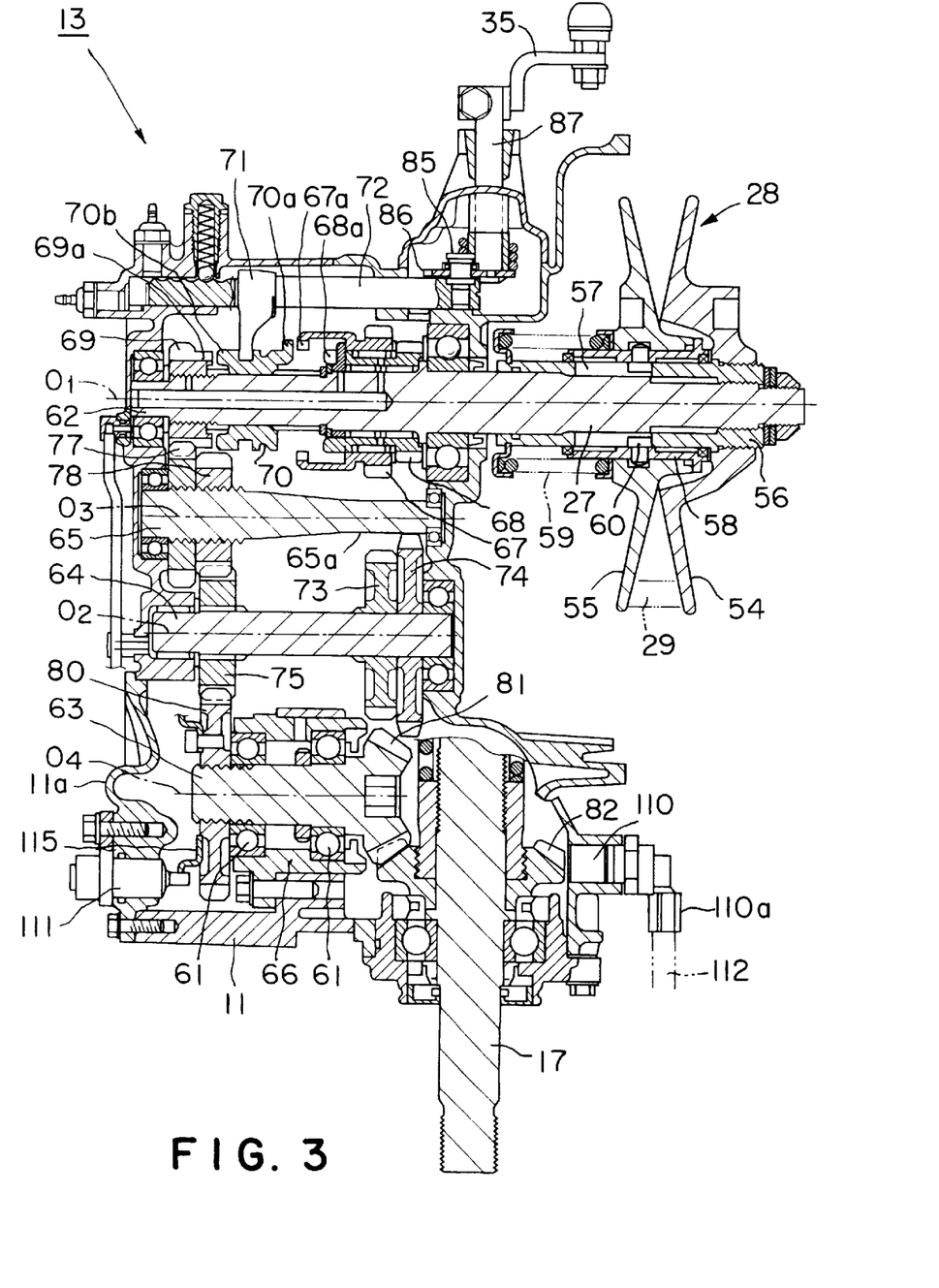
FIG. 3 is a developed sectional view of a gear transmission in a plane including the axes of shafts included in the gear transmission.

Referring to FIG. 3, the driven pulley 28 has a fixed part 54 on the right side and a movable part 55 on the left side. The fixed part 54 is fixedly mounted on a tubular cam shaft 56 fixed to a driven shaft 27. The fixed part 54 is incapable of rotating and axially moving relative to the cam shaft 56. The cam shaft 56 is provided with a plurality of helical guide grooves 57. A sleeve 58 fixedly fitted in a central hole formed in the movable part 55 is mounted on the cam shaft 56 for rotation and axial movement relative to the cam shaft 56. The sleeve 58 is biased toward the fixed part 54 by a pressure regulating spring 59. Cam rollers 60 supported on the sleeve 58 are slidably engaged in the guide grooves 57. When the movable part 55 is turned in a rotating direction by an increased torque exerted thereon by the V belt 29, the movable part 55 is biased toward the fixed part 54 by the cam action of the cam rollers 60 and the guide grooves 57, so that pressure compressing the V belt 29 increases.

Gear Transmission 13 and Shifting Mechanism

Figure 4:
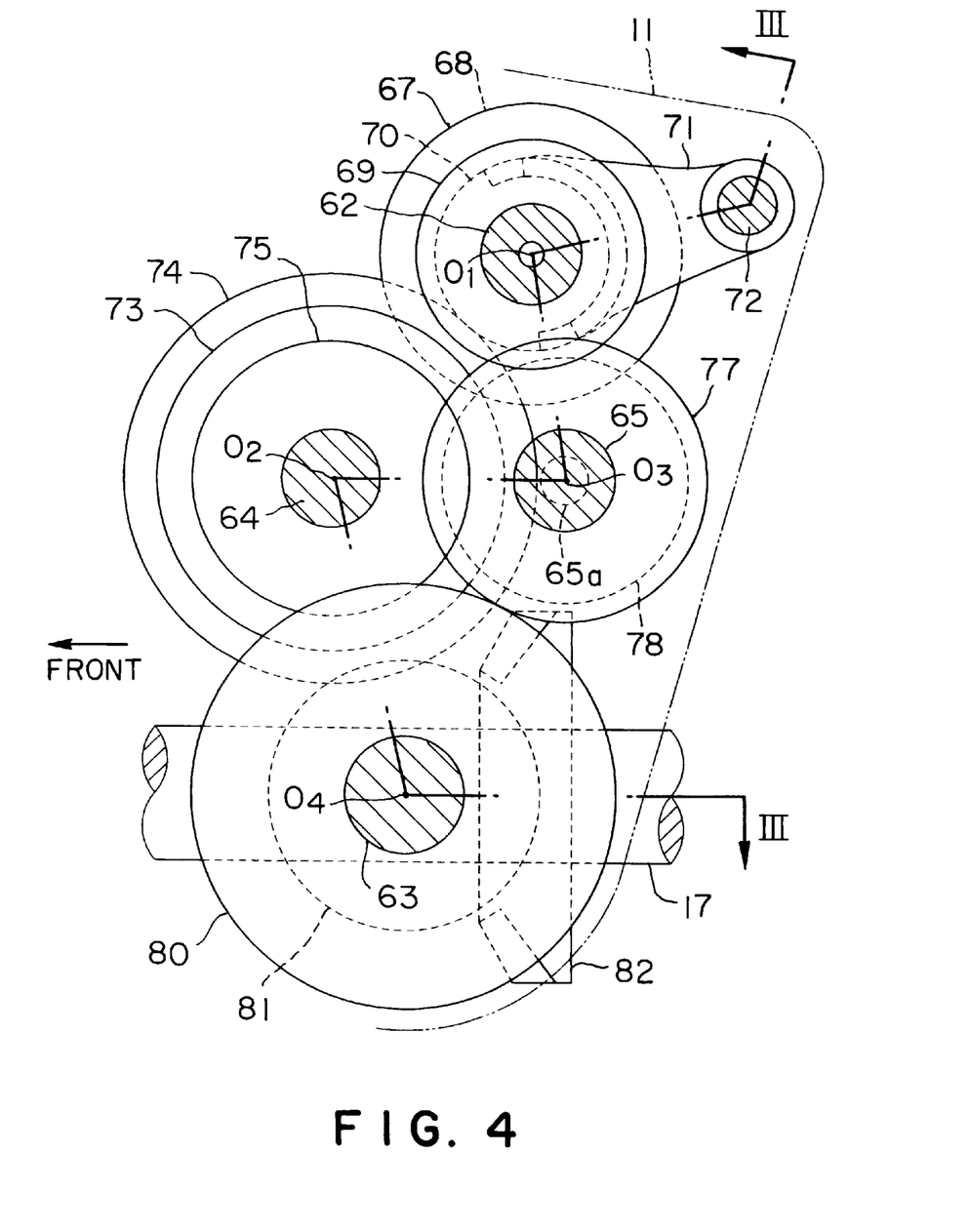
FIG. 4 is a sectional side elevation of the shafts of the gear transmission formed in a transmission case.

Referring to FIG. 4 showing the arrangement of shafts in the transmission case 11, an input shaft 62 is extended laterally in an upper region in the transmission case 11, an output shaft 63 is extended in parallel to the input shaft 62 in a lower region in the transmission case 11, a counter shaft 64 is extended in parallel to the input shaft 62 on the front side of a plane including the axis $O_1$ of the input shaft and the axis $O_4$ of the output shaft 63, and a reversing idle shaft 65 is extended in parallel to the input shaft 62 on the rear side of the same plane. The counter shaft 64 and the reversing idle shaft 65 are on substantially the same level. A shifter shaft 72 is disposed in parallel to the input shaft 62 at an obliquely above and behind the input shaft 62. Since the counter shaft 64, on which a forward low-speed intermediate gear 74 having the largest diameter among those of gears included in the gear transmission 13 is mounted, is disposed in a front region in which a relatively large space is available and the reversing idle shaft 65 is disposed in a rear region, the back wall of the transmission case 11 does not need to be bulged rearward. The drive shaft 17 and the output shaft 63 are on substantially the same level.

FIG. 3 is a developed sectional view in planes including the axes $O_1$, $O_2$, $O_3$ and $O_4$ of the shafts of the gear transmission 13, i.e., a sectional view taken on line III–III in FIG. 4. Referring to FIG. 3, the input shaft 62 is formed integrally with the driven shaft 27 supporting the driven pulley 28. Opposite ends of the input shaft 62, the counter shaft 64 and the reversing idle shaft 65 are supported in bearings on the right and the left side wall of the transmission case 11. The output shaft 63, which is shorter than the shafts 62, 64 and 65 is supported in bearings 61 on a shaft holder 66 fixedly disposed in the transmission case 11. The drive shaft 17 is extended on the right side of the output shaft 63. A forward high-speed gear 67 and a forward low-speed gear 68 are mounted axially contiguously on a right end part of the input shaft 62. A reverse gear 69 is mounted on a left end part of the input shaft 62. A shift sleeve 70 included in a dog clutch mechanism is spliend onto a middle part of the input shaft 62 so as to be axially movable on the input shaft 62. The reverse gear 69 is provided on its right end surface with projections 69a and is supported for rotation by a needle bearing on the input shaft 62. The forward low-speed gear 68 has a boss extending to the left and provided on its left end with projections 68a. The forward low-speed gear 68 is supported for rotation by a needle bearing on the input shaft 62. The forward high-speed gear 68 has an arm extending to the left and provided on its left end with projections 67a projecting radially inward. The forward high-speed gear 67 is supported for rotation by a needle bearing on the boss of the forward low-speed gear 68. Forward-drive projections 70a and reverse-drive projections 70b are formed on the right and the left end surface of the shift sleeve 70, respectively. The distance between the projections 67a and 68a is determined so that the forward-drive projections 70a of the sleeve 70 can be temporarily located at a neutral position.

A shifting fork 71 fixed to the shifter shaft 72 is engaged in an annular groove formed in the outer circumference of the shift sleeve 70. The shifter shaft 72 is supported for lateral movement on the transmission case 11. In FIG. 3, the shift sleeve 70 is located at the neutral position. The reverse-drive projections 70b of the shift sleeve 70 are engaged with the projections 69a of the reverse gear 69 when the shift sleeve 70 is shifted to the left from the neutral position. When the shift sleeve 70 is moved to the right from the neutral position, the forward-drive projections 70a of the shift sleeve 70 are engaged with the projections 67a of the forward high-speed gear 67. When the shift sleeve 70 is shifted further via the neutral position to the right, the forward-drive projections 70a of the shift sleeve 70 are disengaged from the projections 67a of the forward high-speed gear 67 and are engaged with the projections 68a of the forward low-speed gear 68. Thus, the gear transmission 13 can be placed in desired one of forward high-speed ratio, forward low-speed ratio, neutral and reverse by moving the single shifting fork 71. A change pin 85 projects upward from a right end part of the shifter shaft 72. An internal change lever 86 is engaged with the change pin 85. The internal change lever 86 is connected to the external change lever 35 by a shaft 87.

Forward intermediate gears 73 and 74 are fixedly mounted on a right end part of the counter shaft 64 and are engaged with the forward high-speed gear 67 and the forward low-speed gear 68, respectively. An intermediate output gear 75 is fixedly mounted on a left end part of the counter shaft 64.

A large-diameter first reverse idle gear 77 and a small-diameter second reverse idle gear 78 are fixedly mounted on a left end part of the reverse idle shaft 65. The first reverse idle gear 77 and the second reverse idle gear 78 are engaged with the reverse gear 69 and the intermediate output gear 75, respectively. A right part 65a of the reverse idle shaft 65 is formed in a diameter smaller than that of a left part of the same. A very small clearance $C_1$ is formed between the circumferential of the right part 65a of the reverse idle shaft 65 and the outer circumference of the forward low-speed intermediate gear 74 having the largest diameter among the gears mounted on the counter shaft 64. Thus, gear transmission 13 is formed so that the center distance between the counter shaft 64 and the reverse idle shaft 65 is reduced to the shortest possible extent. The intermediate output gear 75 is engaged with an output gear 80 fixedly mounted on a left end part of the output shaft 63. A bevel gear 81 formed integrally with a right end part of the output shaft 63 is engaged with a bevel gear 82 fixedly mounted on the drive shaft 17.

Engine Brake Device

Referring to FIG. 6, the restricting lever 89 for maintaining engine brake effective is disposed on the right side of the support plate 47 combined with the drive pulley 26. The restricting lever 89 is fastened to a lever operating shaft 90 supported for turning on a protrusion 94 formed on the belt cover by a fastening pin 101. The restricting lever 89 is disposed so that its free end can be brought into contact with the annular seat 92 fitted in the bearing 50.

Figure 5:
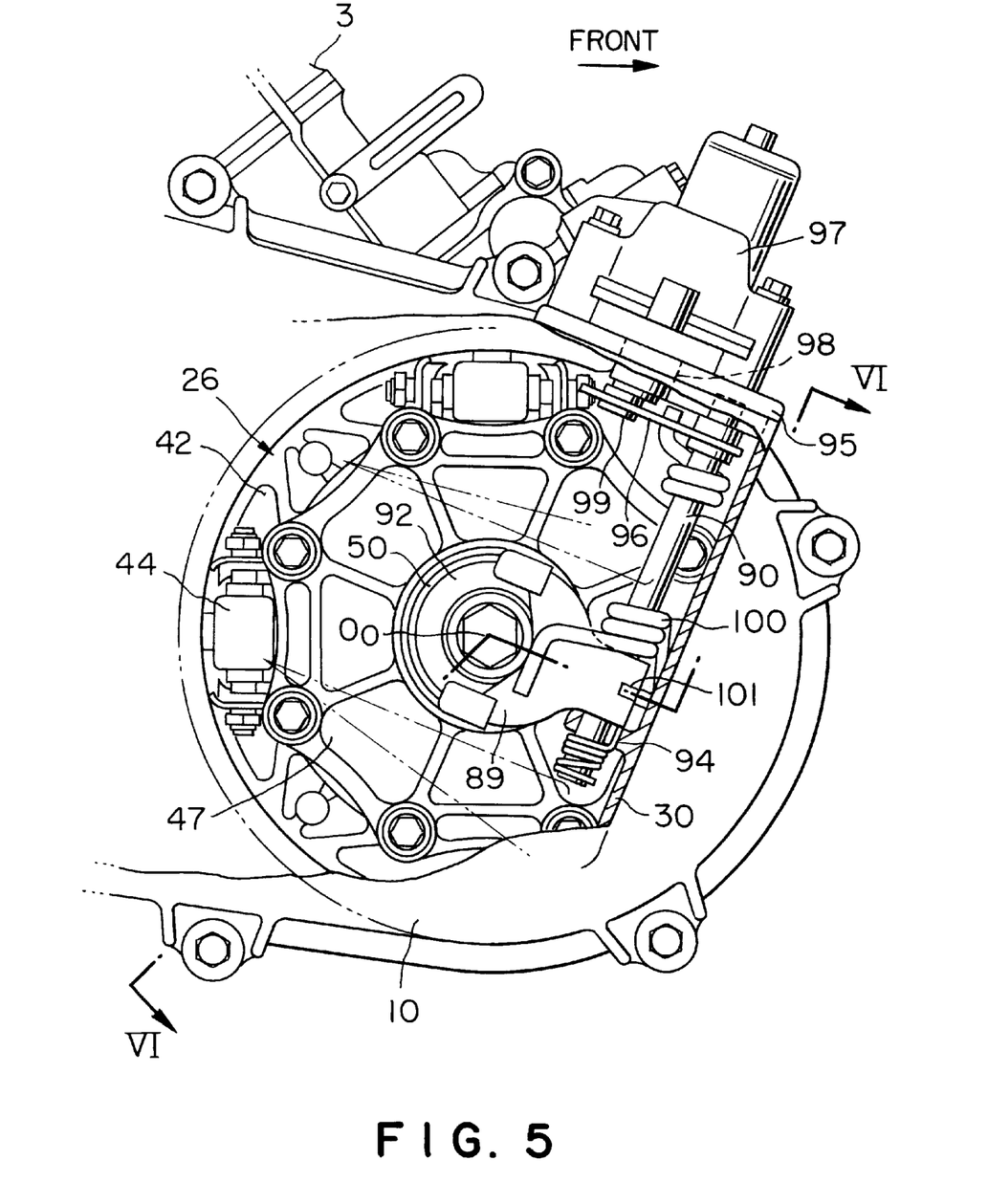
FIG. 5 is a right-hand side elevation of a drive pulley combined with an engine brake device.

Referring to FIG. 5 showing the right side of the drive pulley 26, an end part of the restricting lever 89 is bifurcated into two legs. The two legs of the restricting lever 89 lie diametrically opposite to each other with respect to the center axis $O_0$ of the drive shaft 25 (the crankshaft 36). The lever operating shaft 90 is disposed on the front side of the axis $O_0$. The lever operating shaft 90 has a lower end part supported for turning on the protrusion 94 formed on the belt cover 30 and an upper end part supported for turning on a motor case 95. A swing lever 96 is fixed to an upper end part of the lever operating shaft 90 and is engaged with an eccentric pin 99 fixed to the output shaft 98 of an electric motor 97. A backlash eliminating torsion coil spring 100 is wound round the lever operating shaft 90. The torsion coil spring 100 urges the restricting lever 89 toward the annular seat 92 relative to the swing lever 96 to eliminate backlash between the fastening pin 101 and a hole formed in the restricting lever 89 to receive the fastening pin 101.

Figure 7:
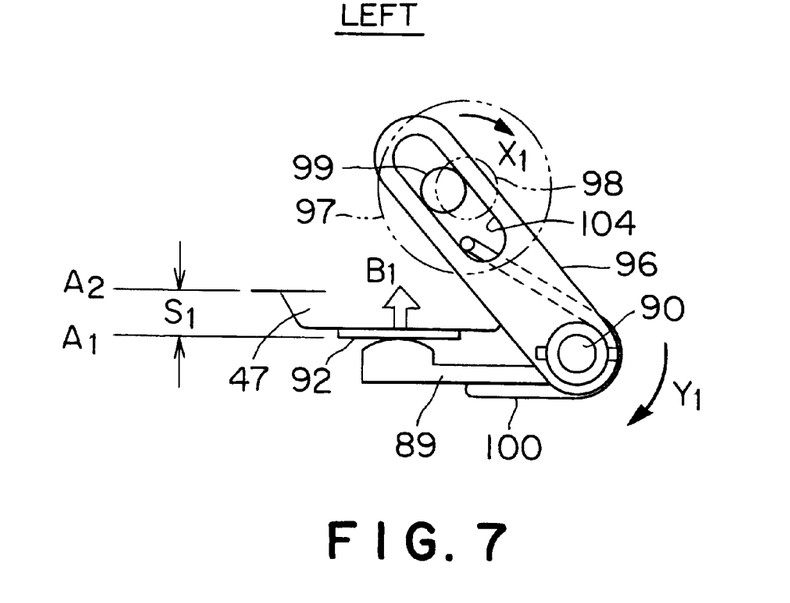
FIG. 7 is a plan view of a restricting lever, a shaft supporting a lever and a swing lever.

FIG. 7 is a top view of the restricting lever 89, the lever operating shaft 90 and the swing lever 96, in which the restricting lever 89 is retracted to the right to a derestricting position $A_1$ to make engine brake ineffective. The eccentric pin 99 attached to the output shaft 98 of the electric motor is engaged in a slot 104 formed in the swing lever 96. When the output shaft 98 of the electric motor 97 is turned in the direction of the arrow $X_1$ from the position shown in FIG. 7, the swing lever 96, the lever operating shaft 90 and the restricting lever 89 are turned together in the direction of the arrow $Y_1$ to move the free end of the restricting lever 89 by a fixed distance $S_1$ from the derestricting position $A_1$ to a restricting position $A_2$. Consequently, the support plate 47 and the movable part 42 of the drive pulley 26 (FIG. 6) are moved to the left by a distance $S_1$ from an engine brake releasing position to an engine brake applying position. In this state, the V belt 29 is compressed between the fixed part 41 and the movable part 42 of the drive pulley 26 to make engine brake effective.

Engine Brake Control System

Figure 9:
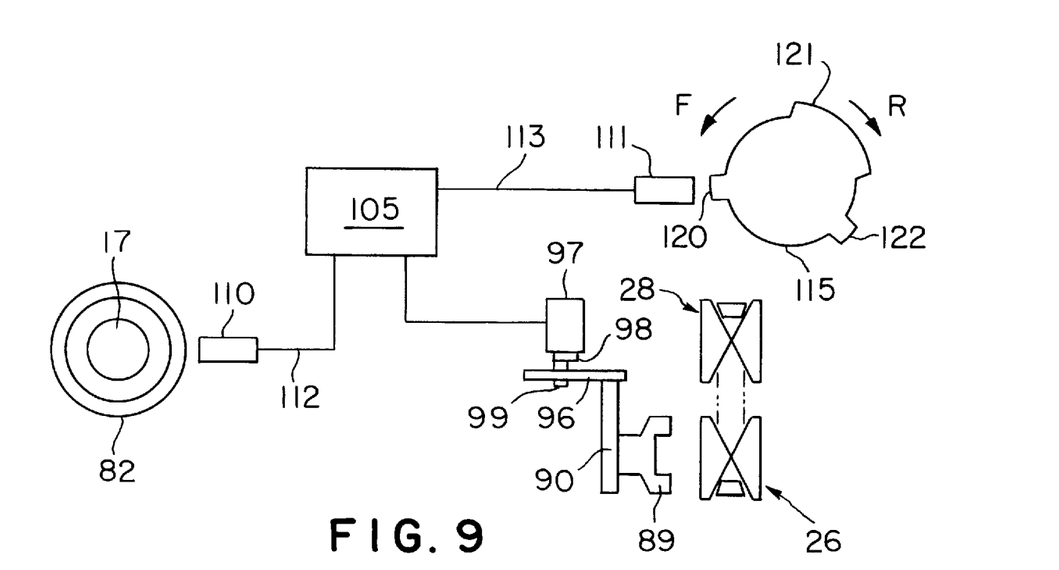
FIG. 9 is a diagrammatic view of an engine brake device and an engine brake control system.

Referring to FIG. 9 showing an engine brake control system, a control unit 105 has an output connected to the electric motor 97, and an input connected to a traveling speed sensor 110 and a traveling mode discriminating sensor 111 by cables (harnesses) 112 and 113. The sensors 11 and 111 are pulse generators provided with sensing devices capable of sensing the variation of magnetic flux and of providing electric pulses. The traveling mode discriminating sensor 111 is disposed near a detection rotor 115 which rotates in directions indicated by the arrows F and R respectively corresponding to a forward travel mode and a reverse travel mode. The traveling mode discriminating sensor 111 detects projections 120, 121 and 122 formed on the detection rotor 115 and gives a traveling mode discriminating signal to the control unit 105. The traveling speed sensor 110 is disposed, for example, opposite to the circumference of the bevel gear 82 mounted on the drive shaft 17. The traveling speed sensor 110 detects the teeth of the bevel gear 82 and gives a traveling speed signal to the control unit 105.

The control unit 105 is programmed such that the control unit 105 gives an engine brake application signal to the electric motor 97 to locate the restricting lever 89 at the restricting position $A_2$ (FIG. 7) while the traveling mode discriminating sensor 11 is generating a signal indicating a forward travel mode and the traveling speed sensor 110 is generating a signal indicating a traveling not lower than a predetermined traveling speed, and the control unit 105 gives an engine brake releasing signal to the electric motor 97 to locate the restricting lever 89 at the derestricting position $A_1$ (FIG. 7) while the traveling mode discriminating sensor 11 is generating a signal indicating a reverse travel mode. The predetermined traveling speed at and above which engine brake is effective is, for example, on the order of 3 km/h. The control unit 105 is placed under the seat 6 (FIG. 1).

Traveling Speed Sensor 110 and Traveling Mode Discriminating Sensor 111

Referring to FIG. 3, the traveling speed sensor 110 and the traveling mode discriminating sensor 111 are disposed on the right and the left side, respectively, of a lower part of the transmission case 11. The traveling speed sensor 110 is fastened to the right side wall of the transmission case 11 opposite to the circumference of the bevel gear 82 fixedly mounted on the drive shaft 17. The cable 112 is connected to a cable connector 110a opening to the rear and connected to the traveling speed sensor 110. The traveling mode discriminating sensor 111 is fixed to a cover 11a attached to the left side wall of the transmission case 11. The detection rotor 115 has the shape of a disk and is fastened to the left side surface of the output gear 80.

Figure 8:
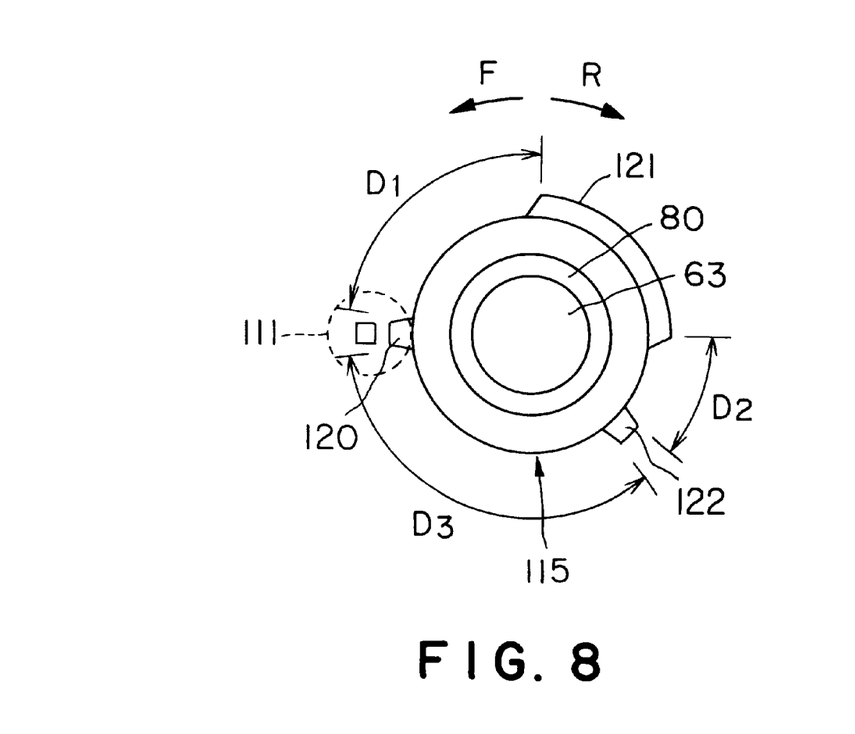
FIG. 8 is an enlarged left-hand side elevation of a detection rotor.

Referring to FIG. 8 showing the detection rotor 115 in a side elevation, the arrow F indicates a rotating direction corresponding to the forward travel mode and the arrow R indicates a rotating direction corresponding to the reverse travel mode. The three projections 120, 121 and 122 project from the outer circumference of the detection rotor 115. The projection 121 is a reference projection having the longest circumferential length substantially corresponding to a quarter of the circumference of the detection rotor 115. The projection 120 is a first short projection spaced a longer circumferential distance $D_1$ (about 90° in central angle) apart from the reference projection 121 in the direction of the arrow F. The projection 122 is a second short projection spaced a shorter circumferential distance $D_2$ (about 45° in central angle) apart from the reference projection 121 in the direction of the arrow R. A circumferential interval between the projections 120 and 122 is $D_3$.

Figure 10:
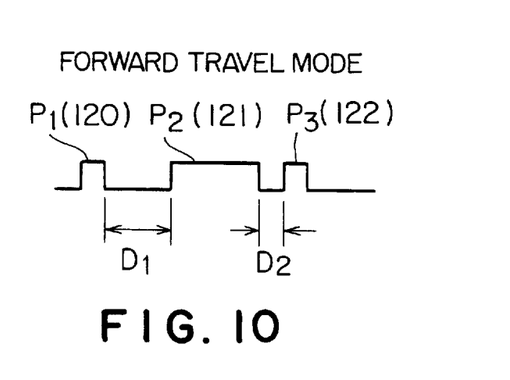
FIG. 10 is a waveform diagram of a forward travel signal indicating a forward travel mode.
Figure 11:
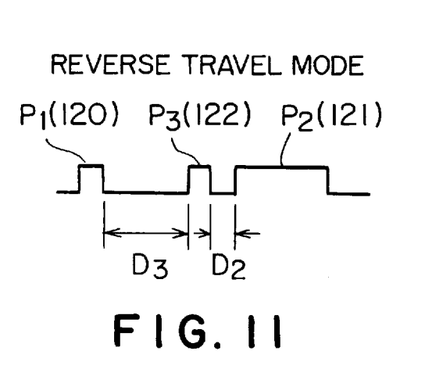
FIG. 11 is a waveform diagram of a reverse travel signal indicating a reverse travel mode.

Since the three projections 120, 121 and 122 are arranged at unequal circumferential intervals, the waveform of a traveling mode discrimination signal provided by the traveling mode discriminating sensor 111 while the detection rotor 115 is rotating in the direction of the arrow F and that of a traveling mode discrimination signal provided by the traveling mode discriminating sensor 111 while the detection rotor 115 is rotating in the direction of the arrow R are different. FIG. 10 shows the waveform of a traveling mode discrimination signal provided by the traveling mode discriminating sensor 111 while the vehicle is traveling in the forward travel mode. The waveform shown in FIG. 10 has a first pulse $P_1$ corresponding to the first projection 120, a second pulse $P_2$ subsequent to the first pulse P1, corresponding to the reference projection 121 and spaced a large interval $D_1$ from the first pulse $P_1$, and a third pulse $P_3$ subsequent to the second pulse $P_2$, corresponding to the second projection 122 and spaced a small interval $D_2$ from the second pulse $P_2$. FIG. 11 shows the waveform of a traveling mode discrimination signal provided by the traveling mode discriminating sensor 111 while the vehicle is traveling in the reverse travel mode. The waveform shown in FIG. 11 has the first pulse $P_1$ corresponding to the first projection 120, the third pulse $P_3$ subsequent to the first pulse $P_1$, corresponding to the second projection 122 and spaced a large interval $D_3$ from the first pulse $P_1$, and the second pulse $P_2$ subsequent to the second pulse $P_3$, corresponding to the reference projection 121 and spaced the interval $D_2$ from the second pulse $P_3$. Thus, the forward travel mode and the reverse travel mode can be discriminated from each other by the traveling mode discrimination signal.

Power Transmission

Referring to FIG. 1, the output torque of the engine 3 is transmitted through the variable-speed V-belt drive 15, the gear transmission 13, the drive shaft 17, and the front propeller shaft 18 and the rear propeller shaft 19, the reduction gears to the front wheels 1 and the rear wheels 2.

Power Transmitting Operation of the Gear Transmission

When placing the gear transmission 13 in the forward high speed, the shift sleeve (FIG. 3) is shifted to the right to engage the projections 70a of the shift sleeve 70 and the 67a of the forward high-speed gear 67. Then, the torque of the input shaft 62 is transmitted through the forward high-speed gear 67, the forward high-speed intermediate gear 73, the counter shaft 64, the intermediate output gear 75 and the output gear 80 to the output shaft 63. Consequently, the output shaft 63 rotates in a direction for forward travel and drives the drive shaft 17 through the bevel gears 81 and 82 for rotation for forward travel.

When placing the gear transmission 13 in the forward low speed, the shift sleeve 70 is shifted to the rightmost position to engage the projections 70a of the shift sleeve 70 and the 68a of the forward low-speed gear 68. Then, the torque of the input shaft 62 is transmitted through the forward low-speed gear 68, the forward low-speed intermediate gear 74, the counter shaft 64, the intermediate output gear 75 and the output gear 80 to the output shaft 63. Consequently, the output shaft 63 rotates in a direction for forward travel and drives the drive shaft 17 through the bevel gears 81 and 82 for rotation for forward travel.

When placing the gear transmission 13 in the reverse, the shift sleeve 70 is shifted to the left to engage the projections 70b of the shift sleeve 70 and the 69a of the reverse gear 69. Then, the torque of the input shaft 62 is transmitted through the reverse gear 69, the first reverse idle gear 77, the reverse idle shaft 65, the second reverse idle gear 78, the intermediate output gear 75 and the output gear 80 to the output shaft 63. Consequently, the output shaft 63 rotates in a direction for reverse travel and drives the drive shaft 17 through the bevel gears 81 and 82 for rotation for reverse travel.

Power Transmitting Operation of the Variable-speed V-belt Drive

The flyweights 45 supported on the drive pulley 26 are retracted as shown in FIG. 6 and the restricting lever 89 is retracted to the derestricting position $A_1$ while the engine is stopped. Consequently, the movable part 42 is moved together with the support plate 47 to the right by the pressure regulating spring 46 and is held at an engine brake releasing position by the rollers 52 supported on the spider 44 to intercept power transmission from the drive pulley 26 to the V belt 29.

Centrifugal force acting on the flyweights 45 increases with the rise of engine speed after the engine has been started and the flyweights 45 are turned gradually away from the movable part 42 of the drive pulley 26. Consequently, the movable part 42 is shifted to the left to compress the V belt 29 between the fixed part 41 and the movable part 42, so that the V belt 29 is operatively connected to the drive pulley 26 and power is transmitted from the drive pulley 26 through the V belt 29 to the driven pulley 28.

Upon the increase of the traveling speed of the vehicle traveling normally forward on a flat road beyond the predetermined traveling speed, the restricting lever 89 is shifted from the derestricting position $A_1$ in the direction of the arrow $B_1$ to the restricting position $A_2$. Since the engine is operating at relatively high engine speeds at this stage, the support plate 47 is moved together with the movable part 42 to the left and is separated from the restricting lever 89. Thus, the movable part 42 moves axially according to the variation of engine speed and load for automatic speed changing operation regardless of the position of the restricting lever 89.

Forward Travel with Engine Brake Applied

Suppose that the vehicle is traveling in the forward travel mode down a slope with the gear transmission 13 shown in FIG. 3 placed in the forward high speed or the forward low speed and the engine operating at an engine speed substantially equal to an idling speed. The traveling mode discriminating sensor 111 (FIG. 9) provides a forward travel mode signal. When the vehicle is accelerated by gravity and the traveling speed of the vehicle exceeds the predetermined traveling speed, the control unit 105 gives a command to the electric motor 97 to turn the output shaft 98 in the direction of the arrow $X_1$ from the position shown in FIG. 7, to move the free end of the restricting lever 89 by the fixed distance $S_1$ from the derestricting position $A_1$ to a restricting position $A_2$. Consequently, the support plate 47 and the movable part 42 of the drive pulley 26 are moved from the position shown in FIG. 6 to the left by the distance $S_1$. In this state, the V belt 29 is compressed between the fixed part 41 and the movable part 42 of the drive pulley 26 to make engine brake effective.

Reverse Travel with Engine Brake Released

Suppose that the vehicle is traveling in the reverse travel mode down a slope with the gear transmission 13 shown in FIG. 3 placed in the forward high speed, the forward low speed, reverse or neutral and the engine operating at an engine speed substantially equal to an idling speed. The traveling mode discriminating sensor 111 provides a reverse travel mode signal. Then the control unit 105 controls the electric motor 97 to hold the restricting lever 89 at the derestricting position $A_1$ and does not give any engine brake application signal to the electric motor 97. Consequently, the restricting lever 89 is held at the derestricting position Al regardless of the traveling speed of the vehicle and engine brake is kept ineffective.

Modifications

Figure 12:
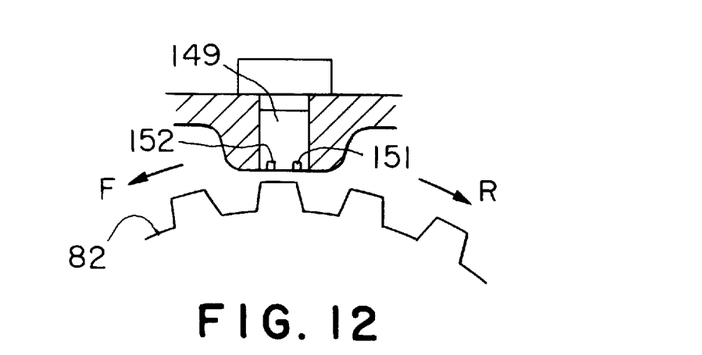
FIG. 12 is a sectional view of a sensor serving as both a traveling speed sensor and a traveling mode discriminating sensor.

The traveling speed sensor 110 and the traveling mode discriminating sensor 11 may be substituted by a single sensor 149 shown in FIG. 12. The sensor 149 is provided with two sensing elements, a first sensing element 151 and a second sensing element 152, spaced from each other with respect to the rotating direction of the bevel gear 82 and placed in a sensor case. Either the sensing elements 151 or 152 is for measuring the traveling speed. When the first sensing element 151 detects a tooth of the bevel gear 82 first and then the second sensing element 152 detects the same tooth, it is decided that the vehicle is traveling in the forward travel mode. When the second sensing element 152 detects a tooth of the bevel gear 82 first and then the first sensing element 151 detects the same tooth, it is decided that the vehicle is traveling in the reverse travel mode. The sensor 149 may be disposed opposite to any one of the gears that rotates in opposite directions for the forward travel mode and the reverse travel mode, respectively, such as the output gear 80 mounted on the output shaft 63, the bevel gear 81 formed integrally with the output shaft 63 or the intermediate output gear 75 mounted on the counter shaft 64, instead of opposite to the bevel gear 82.

The traveling speed sensor 110 may be disposed opposite to the output gear 80 mounted on the output shaft 63, the bevel gear 81 formed integrally with the output shaft 63, one of the gears of the front reduction gear contained in the front reduction gear case 21 (FIG. 1) or one of the gears of the rear reduction gear contained in the rear reduction gear case 22 instead of opposite to the bevel gear 82. Naturally, the front wheel 1 or the rear wheel 2 can be used for measuring the traveling speed of the vehicle.

The rotating member used in combination with the traveling mode discriminating sensor 111 to discriminate between the forward travel mode and the reverse travel mode may be the bevel gear 82 mounted on the drive shaft 17, the bevel gear 81 formed integrally with the output shaft 63 or the intermediate output gear 75 mounted on the counter shaft 64. The rotating member to be used in combination with the traveling mode discriminating sensor 111 may be any suitable rotating member provided that the rotating member rotates in opposite directions for the forward travel mode and the reverse travel mode, respectively.

The detection rotor 115 shown in FIG. 3 and the output gear 80 are separate members. The detection rotor 115 may be formed integrally with the output gear 80.

In FIG. 3, the traveling mode discriminating sensor 111 is disposed radially opposite to the circumference of the detection rotor 115. The traveling mode discriminating sensor 111 may be disposed axially opposite to the side surface of the detection rotor 115.

As apparent from the foregoing description, the engine brake control system for the vehicle provided with the variable-speed V-belt drive and the gear transmission comprises the traveling speed sensor, the traveling mode discriminating sensor, and the engine brake device capable of making engine brake effective by restricting the decrease of the effective diameter of the drive pulley of the variable-speed V-belt drive while the vehicle is traveling at a traveling speed not lower than the predetermined traveling speed, and engine brake is made ineffective when the traveling mode discriminating sensor detects the reverse travel of the vehicle. Thus engine brake is applied automatically while the vehicle is traveling in a forward travel mode down a slope to restrict the increase of the traveling speed. On the other hand, when the vehicle is traveling in a reverse travel mode down a slope, engine brake is made ineffective to avoid making the rider feel an unpleasant feeling. The present invention is particularly effectively applicable to a straddle-type all-terrain vehicle because the rider of such a vehicle is exposed.

The detection rotor is attached to the rotating member which rotates in directions respectively corresponding to the forward travel mode and the reverse travel mode opposite to the traveling mode discriminating sensor, and the detection rotor is provided with the three or more projections arranged at unequal angular intervals. Thus the rotating direction of the detection rotor in the forward travel mode and that of the same in the reverse travel mode can be easily discriminated.

The traveling mode discriminating sensor and the traveling speed sensor are disposed so as to detect the rotation of the drive shaft connected by the bevel gear mechanism to the output shaft of the gear transmission. Thus the traveling mode discriminating sensor and the traveling speed sensor can be easily mounted on the vehicle in a compact arrangement.

When the traveling mode discriminating sensor and the traveling speed sensor are disposed on the opposite side of the gear transmission, the space in the transmission case can be effectively utilized, the traveling mode discriminating sensor and the traveling speed sensor can be disposed in a further compact arrangement and can be easily mounted on the vehicle.

When the traveling speed sensor is disposed near the outer circumference of the bevel gear mounted on the drive shaft, and the traveling mode discriminating sensor is disposed near an end of the output shaft opposite the other end of the output shaft on the side of the drive shaft, the sensors can be further easily mounted on the vehicle.

The plurality of projections formed on the rotor so as to be detected by the traveling mode discriminating sensor have different circumferential lengths, respectively. Thus false discrimination between a forward travel mode and a reverse travel mode can be prevented by such a simple device.

What is claimed is:

1. An engine brake control system for a vehicle provided with a variable-speed V-belt drive including a drive pulley and a gear transmission disposed below the variable-speed V-belt drive with respect to a power transmitting direction, said engine brake control system comprising:
    a traveling speed sensor for measuring traveling speed of the vehicle;
    a traveling mode discriminating sensor for discriminating between a forward travel mode and a reverse travel mode; and
    an engine brake device capable of making engine brake effective by restricting the decrease of effective diameter of the drive pulley while the vehicle is traveling at a traveling speed not lower than a predetermined traveling speed;
    wherein engine brake is made ineffective while the traveling mode discriminating sensor is providing a signal indicating the reverse travel mode.

2. The engine brake control system according to claim 1, wherein a detection rotor is attached to a rotating member which rotates in directions respectively corresponding to the forward travel mode and the reverse travel mode, the traveling mode discriminating sensor is disposed opposite to the detection rotor, and the detection rotor is provided with three or more projections arranged at unequal angular intervals.

3. The engine brake control system according to claim 1, wherein the traveling mode discriminating sensor and the traveling speed sensor are disposed so as to detect the rotation of an output shaft included in a gear transmission or a drive shaft connected by a bevel gear mechanism to the output shaft of the gear transmission.

4. The engine brake control system according to claim 3, wherein the traveling mode discriminating sensor and the traveling speed sensor are disposed on the axially opposite sides, respectively, of the gear transmission.

5. The engine brake control system according to claim 4, wherein the traveling speed sensor is disposed near an outer circumference of a bevel gear mounted on the drive shaft, and the traveling mode discriminating sensor is disposed near an end of the output shaft opposite the other end of the output shaft on the side of the drive shaft.

6. The engine brake control system according to claim 2, wherein the plurality of projections formed on the rotor have different circumferential lengths, respectively.

* * * * *

UNITED STATES PATENT AND TRADEMARK OFFICE
CERTIFICATE OF CORRECTION

PATENT NO. : 6,569,056 B2
DATED : May 27, 2003
INVENTOR(S) : Yasuhiro Kuji et al.

It is certified that error appears in the above-identified patent and that said Letters Patent is hereby corrected as shown below:

<u>Title page,</u>
Item [73], correct Assignee's name from "Kawasaki Jukugyo Kabushiki Kaisha" to
-- Kawasaki Jukogyo Kabushiki Kaisha. --

Signed and Sealed this

Twenty-second Day of July, 2003

JAMES E. ROGAN
*Director of the United States Patent and Trademark Office*